United States Patent
Guenanten et al.

(10) Patent No.: US 9,987,828 B2
(45) Date of Patent: Jun. 5, 2018

(54) CO-EXTRUDED IMPACT-MODIFIED PMMA FILM

(71) Applicants: Claude Guenanten, Darmstadt (DE); Michael Enders, Dieburg (DE); Lukas Friedrich Doessel, Darmstadt (DE); Karsten Postert, Frankfurt (DE); Dominic Stoerkle, Darmstadt (DE)

(72) Inventors: Claude Guenanten, Darmstadt (DE); Michael Enders, Dieburg (DE); Lukas Friedrich Doessel, Darmstadt (DE); Karsten Postert, Frankfurt (DE); Dominic Stoerkle, Darmstadt (DE)

(73) Assignee: Evonik Roehm GmbH, Darmstadt (DE)

( * ) Notice: Subject to any disclaimer, the term of this patent is extended or adjusted under 35 U.S.C. 154(b) by 599 days.

(21) Appl. No.: 14/382,695

(22) PCT Filed: Apr. 12, 2013

(86) PCT No.: PCT/EP2013/057645
§ 371 (c)(1),
(2) Date: Sep. 3, 2014

(87) PCT Pub. No.: WO2013/160121
PCT Pub. Date: Oct. 31, 2013

(65) Prior Publication Data
US 2015/0044441 A1   Feb. 12, 2015

(30) Foreign Application Priority Data
Apr. 27, 2012   (DE) .................. 10 2012 207 100

(51) Int. Cl.
*B32B 27/30* (2006.01)
*B32B 27/20* (2006.01)
*B32B 5/16* (2006.01)
*B32B 27/08* (2006.01)
*B32B 37/12* (2006.01)

(52) U.S. Cl.
CPC .............. *B32B 27/308* (2013.01); *B32B 5/16* (2013.01); *B32B 27/08* (2013.01); *B32B 27/20* (2013.01); *B32B 37/12* (2013.01); *B32B 2250/02* (2013.01); *B32B 2250/03* (2013.01); *B32B 2250/246* (2013.01); *B32B 2264/02* (2013.01); *B32B 2264/10* (2013.01); *B32B 2307/558* (2013.01); *B32B 2307/712* (2013.01); *B32B 2333/12* (2013.01); *B32B 2571/00* (2013.01); *Y10T 156/10* (2015.01); *Y10T 428/24975* (2015.01); *Y10T 428/254* (2015.01); *Y10T 428/256* (2015.01); *Y10T 428/259* (2015.01); *Y10T 428/263* (2015.01); *Y10T 428/31928* (2015.04)

(58) Field of Classification Search
CPC ............ B32B 2250/02; B32B 2250/03; B32B 2250/246; B32B 2264/02; B32B 2264/10; B32B 2307/558; B32B 2307/712; B32B 2333/12; B32B 2571/00; B32B 27/08; B32B 27/20; B32B 27/308; B32B 37/12; B32B 5/16
USPC ............... 428/216, 327, 328, 331, 334, 520; 156/60
See application file for complete search history.

(56) References Cited

U.S. PATENT DOCUMENTS

| | | |
|---|---|---|
| 6,475,420 B1 | 11/2002 | Numrich et al. |
| 8,206,782 B2 | 6/2012 | Numrich et al. |
| 2005/0085607 A1 | 4/2005 | Kabs et al. |
| 2008/0281023 A1 | 11/2008 | Numrich et al. |
| 2009/0134566 A1* | 5/2009 | Sumi ..................... B41J 3/407 271/109 |
| 2010/0189983 A1* | 7/2010 | Numrich ............... B29C 47/065 428/220 |
| 2011/0009566 A1* | 1/2011 | Jain ....................... C08L 77/00 525/178 |
| 2011/0171441 A1 | 7/2011 | Choi et al. |
| 2013/0136910 A1 | 5/2013 | Numrich et al. |

FOREIGN PATENT DOCUMENTS

DE   10 2005 062 687   7/2007

OTHER PUBLICATIONS

Combined Taiwanese Office Action and Search Report dated Sep. 9, 2016 in Patent Application No. 102114847 (with English language translation).
U.S. Appl. No. 15/313,987, Jul. 13, 2017, 2017/0197391, Parusel, et al.
U.S. Appl. No. 15/513,649, Oct. 19, 2017, 2017/0298217, Doessel, et al.
International Search Report dated Jul. 31, 2013 in PCT/EP13/057645 Filed Apr. 12, 2013.

* cited by examiner

Primary Examiner — Lawrence Ferguson
(74) Attorney, Agent, or Firm — Oblon, McClelland, Maier & Neustadt, L.L.P.

(57) ABSTRACT

The present invention relates to novel matt PMMA foils for application on materials as foil providing protection from weathering effects and as decorative foil. In particular, the present invention relates to a novel, at least two-layer PMMA foil which features particularly good adhesion on the substrate. The outer layer here exhibits the mattness, and the inner layer here comprises a low-molecular-weight component which improves adhesion on the substrate.

18 Claims, No Drawings

CO-EXTRUDED IMPACT-MODIFIED PMMA FILM

FIELD OF THE INVENTION

The present invention relates to novel matt PMMA foils for application on materials as foil providing protection from weathering effects and as decorative foil. In particular, the present invention relates to a novel, at least two-layer PMMA foil which features particularly good adhesion on the substrate. The outer layer here exhibits the mattness, and the inner layer here comprises a low-molecular-weight component which improves adhesion on the substrate.

PRIOR ART

A successful method of protecting materials from mechanical stress and from weathering effects is to coat the same with a transparent PMMA foil. These foils have a smooth, high-gloss surface. There are now many applications for which a matt surface with low reflectivity is desirable. Matt surfaces of thermoplastics substrates, in particular of foils, are generally produced with the aid of a specific matt roll or of a rubberized roll. JP 90 28 239 describes by way of example the production of a film or of a sheet with matt surface, composed of vinylidene fluoride resin and methacrylic ester resin, through extrusion and passage of the extrudate through an embossing-roller system. However, foils produced in this way have the disadvantage that they lose their embossment structure and therefore their mattness on slight stretching, as by way of example occurs by way of edges during the lamination of foils, or by virtue of the pressure during the lamination procedure (in which connection see Winnacker/Küchler, Vol. 6, pp. 471, 4th Edn., 1982, Carl Hanser Verlag Munich, Vienna).

Matt effects on the surface can moreover be produced by polymer mixtures with a certain heterogeneous mixed-phase morphology, which is optionally stabilized by further additions. Inorganic pigments as mentioned by way of example in JP 89 234 427 are dimensionally stable matting agents. Here, a matt surface is produced on polyester films by adding CaCO$_3$ or BaSO$_4$ together with microbeads made of acrylic polymers, such as polymethyl methacrylate, during the extrusion process. However, because the inorganic pigments have high refractive indices, the transparency of the films is very small as a result of high scattered-light losses. Another disadvantage is the wear of the roll surfaces during the foil extrusion process, brought about by the inorganic pigments, which cause abrasion.

Many applications therefore use crosslinked polymer particles as scattering pigments which produce the matt effect. Hence JP 84 89 344 describes a weather-resistant protective film with matt surface, composed of mixtures of polymers made of fluorinated, ethylenically unsaturated monomers, of a crosslinked (meth)acrylate polymer produced in a plurality of stages, and of a matting agent, which is composed of crosslinked particles of average diameter from 1 to 500 nm. The scattering capability of the said particles is based firstly on their size and secondly on the difference between the refractive indices of particles and matrix. A disadvantage is incompatibility between particles and matrix, and this leads to considerable impairment of the mechanical properties of the matrix material.

EP 1 249 339 describes a PMMA foil which firstly comprises a matting agent, which involves OH-functional poly(meth)acrylates, according to the prior art, and secondly has been surface-structured by means of an appropriate roll, and on the other side is smooth.

EP 1 380 403 describes a very similar process for the production of PMMA foils, but here the single-side mattness is produced through different roll temperatures and not by different roll surfaces.

However, all foils comprising matting agents exhibit reduced adhesion on substrates such as PVC. It is a general rule that the matting agents lead to a corresponding reduction of adhesion. A first possibility for improving the adhesion is to use an adhesive or superficially applied adhesion promoter. However, this has the disadvantage that an additional step is needed in the application process. Another possibility is to formulate the polymer matrix to be softer. However, the resultant film is also tacky during processing at higher temperatures, and problems therefore arise during draw-off from feed rolls. At significantly higher lamination temperatures the lamination pressure forces the matting agents down into the moulding composition of the foil, or the surface of the lamination roll or embossing roll is replicated onto the surface of the composite. The effect of the matting agents is thus reduced.

PVC is a particularly important substrate for these matt foils, since it can be used by way of example to provide a decorative effect to window profiles, gates or façade elements, and protection from weathering can be simultaneously ensured.

EP 0 528 196 discloses a PMMA foil which comprises crosslinked polymethacrylate particles as matting agents. Although these particles make a better contribution than inorganic particles to adhesion on a substrate, this system nevertheless still exhibits significantly unsatisfactory adhesion.

According to WO 2006/043672, the said problem was solved by coating one side of a transparent PMMA foil with a flowable coating material with matting effect. A similar system is also found in JP 2008-030353 (publication number). Here, an impact-resistant PMMA foil is coated with a flowable coating material which is composed of an acrylate binder and of silica particles. Although the side facing towards the substrate is thus free from matting agents, these systems have the disadvantage that a thin coating with matting effect is significantly more susceptible to abrasion than a PMMA foil in which the matrix comprises the matting agent. Furthermore, again here these PMMA foils still lack ideal adhesion in relation to some substrates, e.g. PVC.

Finally, U.S. 2009/0252936 discloses a transparent coextrudate made of a polycarbonate layer and of a PMMA layer and, in addition, provided with a matt layer of thickness from 1 to 20 µm. Here again, the matt layer is equally applied in the form of flowable coating material. The said disclosure does not moreover teach how the adhesion of the matt foils in relation to the substrate can easily be improved. In this connection, it may be noted that polycarbonates have even poorer adhesion than PMMA in relation to many substrates.

OBJECT

It was therefore an object of the present invention in the light of the prior art to provide a novel PMMA foil which can be applied easily and without additional adhesive layer, while exhibiting good initial adhesion, and also good long-term adhesion, on the substrate, e.g. PVC.

A particular object of the present invention was to provide a novel matt PMMA foil with particularly good initial adhesion, and also particularly good long-term adhesion.

Another object of the present invention was to provide a foil which ensures not only high intrinsic weathering resistance, but also, for articles susceptible to weathering, adequate protection from moisture, wind, insolation and in particular UV radiation.

A further intention is that the matt PMMA foils have mattness which is of good optical quality and which is stable in the long term.

Other objects not explicitly mentioned are apparent from the description below, and also from examples and the claims of the present specification.

ACHIEVEMENT OF OBJECT

The objects are achieved by means of a novel PMMA foil which has at least two layers, which respectively in turn comprise a PMMA matrix material. The said PMMA foil is in particular characterized in that at least one of the two layers comprises an impact modifier, and that the inner layer comprises, in addition to the PMMA matrix material, from 2.0 to 20% by weight of an oligomeric PMMA, with weight-average molar mass of from 300 to 1500 g/mol. It is preferable that the matrix material of the inner layer comprises from 5.0 to 18% by weight, and particularly preferably from 10 to 12% by weight, of the oligomeric PMMA. The average molar mass here is measured by means of SEC against a PMMA standard.

Surprisingly, it has been found that corresponding foils comprising the stated amounts of the oligomeric constituent provide particularly good adhesion of the inner layer on a substrate, e.g. PVC, and that the said adhesion is particularly long-lasting, without any adverse effect on the other mechanical or optical properties of the foil. Equally surprisingly, it has been found that by virtue of the two-layer-foil structure, comprising the oligomeric component only in the inner layer, it was possible to provide a foil which does not become tacky on the external side, even on exposure to relatively high temperatures, and accordingly a) is easy to process and b) after application on a substrate has surface properties just as good as those of prior-art foils which have poorer adhesion.

Another advantage of the PMMA foils according to the invention is that, in comparison with foils of the prior art, the internal side of the foil is easier to print.

In one preferred embodiment, the PMMA foil involves a foil which comprises, in the outer layer, from 0.5 to 20% by weight, preferably from 2.0 to 18% by weight and particularly preferably from 4.0 to 15% by weight, of one or more matting agents. The said matting agents in particular involve $SiO_x$ particles, $TiO_2$ particles, $BaSO_4$ particles or $BaCO_3$ particles, or involve crosslinked polymer particles or involve a mixture of two or more of the said particles. The crosslinked polymer particles are preferably crosslinked PMMA particles or crosslinked silicone particles. It is particularly preferable that the matting agents involve crosslinked PMMA particles.

The diameter of the particles used as matting agents is generally from 1 to 40 µm, preferably from 1.5 to 20 µm and particularly preferably from 2.0 to 6.0 µm.

In another embodiment, which can also be combined with the abovementioned preferred embodiment, the inner layer comprises from 0.01 to 0.5% by weight, preferably from 0.02 to 0.05% by weight, of one or more antiblocking agents. The effect of the antiblocking agent in the inner layer is that during processing, for example when the foil is taken off from a feed roll, it is easier to achieve separation from the next layer on the roll. This leads to faster process sequences and to processing with fewer problems. The said antiblocking agents in particular involve $SiO_x$ particles, $TiO_2$ particles, $BaSO_4$ particles or $BaCO_3$ particles, crosslinked PMMA particles or crosslinked silicone particles with a diameter of from 0.5 µm to 40 µm, preferably from 1.5 to 20 µm and particularly preferably from 2.0 to 6.0 µm. It is preferable to use particles of silicon oxide ($SiO_x$) as antiblocking agents.

The impact modifiers present according to the invention in the PMMA foil preferably involve a core-shell particle or a core-shell-shell particle, with at least one shell made of a poly(meth)acrylate. Particular preference is given to particles with a soft core, i.e. with a core having a glass transition temperature below 0° C., preferably below −10° C., and with a shell having a glass transition temperature above 20° C., preferably above 70° C. The soft phase here is generally composed mainly of repeating acrylate units having from 1 to 6 carbon atoms in the alkyl moiety, and the hard phase here is generally composed mainly of repeating MMA units. The average particle diameter of the impact modifiers is preferably from 10 to 150 nm. In the case of the impact modifiers, the particle diameter is determined by means of measurements using the ultracentrifuge method. WO 2007/073952 provides a more detailed description of suitable impact modifiers for a PMMA matrix material.

The impact-modified poly(meth)acrylate of the inner and/or the outer layer is generally composed of from 20 to 80% by weight, preferably of from 30 to 70% by weight, of the PMMA matrix material and of from 20 to 80% by weight, preferably of from 30 to 70% by weight, of impact modifier. These data take no account of matting agents, antiblocking agents and any other additives or dyes. However, the data by mass relating to the PMMA matrix material comprise the oligomeric PMMA.

The impact modifiers can be present not only in the inner layer but also in the outer layer of the PMMA foil. In one particularly preferred embodiment, impact modifiers are present in both layers, and the same, or else different, impact modifiers can be involved here.

The PMMA foil according to the invention is composed of the impact modifiers mentioned and of the PMMA matrix material, alongside possible additives, matting agents and/or antiblocking agents. The expression PMMA matrix material here does not invariably mean that this is composed exclusively of PMMA, but instead means that the monomer composition used for the production process comprises from 80 to 100% by weight of MMA.

The monomer composition used for the polymerization process can moreover comprise a further from 0 to 20% by weight of one or more other ethylenically unsaturated monomers capable of free-radical copolymerization with MMA. It is preferable that alkyl acrylates are involved here. EP 1 963 415 provides a specification for the production of suitable matrix materials and a list of the comononers that can be used. These data are to be used not only for the matrix material of the outer layer but also for the from 80 to 98% by weight of the PMMA matrix material of the inner layer which do not represent the oligomeric component.

In a particular embodiment, the outer layer involves a PMMA layer that can withstand mechanical load. This means that the PMMA matrix material used in that location has a particularly high molar mass. The said particularly high molecular mass is from 100 000 to 200 000 g/mol, preferably from 120 000 to 170 000 g/mol.

The provisions applicable to the composition of the oligomeric PMMA component which can be present at a concentration of from 2.0 to 20% by weight in the PMMA matrix material of the inner layer are in particular the same as for the non-oligomeric constituents of the PMMA matrix material, as stated in the previous paragraph. The composition of the oligomeric component is preferably the same as or at least very similar to that of the non-oligomeric constituents of the PMMA matrix material of the inner layer. The oligomeric PMMA component can moreover be produced by means of bulk polymerization or solution polymerization with subsequent removal of the solvent or precipitation of the polymer, e.g. in methanol or diethyl ether. The synthesis is readily accessible to the person skilled in the art. In order to achieve an appropriately low molar mass of from 300 and 1500 g/mol, appropriately high concentrations of an initiator, and optionally high concentrations of a chain-transfer agent (chain-transfer reagent) are used, at optionally high temperatures, by way of example above 100° C.

Initiators generally used for the production of the oligomeric PMMA component are peroxides and/or azo initiators, preferably with a decomposition temperature such that the half-life time is one hour below 100° C., preferably below 80° C. and particularly preferably below 60° C.

Chain transfer agents can be used in addition in order to achieve the low molar masses of from 300 to 1500 g/mol. These generally involve mercaptans, where these are used industrially for the said purpose, and where the specific selection of these should be a simple matter for the person skilled in the art.

It is preferable to carry out a solution polymerization process in a ketone, such as acetone or methyl ethyl ketone, or in an acetate, e.g. ethyl acetate, propyl acetate or butyl acetate. The solvents mentioned have the advantage that they are well-established for the said purpose in industry and do not raise toxicological concerns. These solvents can moreover be removed easily and completely after the polymerization process.

Prior to the production of the foil, the resultant oligomeric PMMA component is mixed with the impact modifier, with the other, higher-molecular-weight PMMA matrix material for the inner layer, and with any other additives. This is achieved either in a separate step of a process by means of a mixing extruder or mixing kneader or directly in the extruder or coextruder which is used for the production of the layer in the form of a foil for producing a laminate layer or a coextrudate layer. In the case of two separate steps of a process, the two devices, e.g. the mixing extruder and the extruder for the foil extrusion process, can also have in-line connection to one another, so that isolation of the mixture is omitted.

As an alternative, the oligomeric PMMA component can also be produced in situ together with the PMMA matrix material for the inner layer. A second initiator with very low decomposition temperature can be introduced at high concentrations into the polymer mixture by way of example after conversion of from 70 to 95% by weight of the monomers. As an alternative, or in addition, the reactor temperature can be significantly raised toward the end of the reaction, and optionally a chain transfer agent or further chain transfer agent can be added. This temperature rise can by way of example be over 20° C., preferably over 30° C., above the actual reaction temperature. This temperature rise firstly accelerates decomposition of the initiator—and thus increases the concentration of initiator. Secondly, chain terminations, or the reaction with chain transfer agents present, preferably occur. As an alternative, it is also possible to use a reactor which has two separate reaction zones with different reaction conditions, e.g. initiator concentration and/or temperature, and the content of the said reaction zones can be combined towards the end of, or after the, polymerization process.

The inner and/or the outer layer of the foil according to the invention can comprise not only the components described but also further additives, e.g. dyes—preferably dyes for transparent colouring—processing aids or stabilizers. The presence of a UV stabilizer package is particularly preferable in the inner and/or outer layer, and is in particular preferable in the outer layer. It is preferable that the said stabilizer package is composed of UV absorbers and of UV stabilizers. The UV stabilizers here generally involve sterically hindered amines (Hindered Amine Light Stabilizer; HALS compounds). The UV absorbers can involve benzophenones, salicylic esters, cinnamic esters, oxanilides, benzoxazinones, hydroxyphenylbenzotriazoles, triazines, benzotriazoles or benzylidenemalonates, and preferably involves triazines and/or benzotriazoles, and particularly preferably involves a mixture of triazines and benzotriazoles. As an alternative, it is also possible that UV absorbers have been copolymerized into the matrix material by means of a polymerizable group. EP 1 963 415 provides a detailed list of suitable compounds and preferred concentration thereof in PMMA foils and PMMA layers.

The thickness of the inner and the outer layer of the PMMA foils according to the invention is preferably from 4 to 200 µm, where the thickness of the inner layer is from 2 µm to 100 µm, preferably from 10 to 60 µm, and the thickness of the outer layer is from 2 µm to 100 µm, preferably from 5 µm to 50 µm.

The PMMA foil according to the invention can optionally have a third layer of thickness from 2 µm to 100 µm, preferably from 5 µm to 50 µm. The location of the said optional third layer here is on the outer layer. It is preferable that the said third layer is composed of a scratch-resistant PMMA, of PVDF, of a laminate or of a coextrudate or of a blend made of PMMA and PVDF (and for brevity the collective generic expression PMMA/PVDF layer is used hereinafter for the latter layer). A further optional fourth layer can by way of example also involve a layer of flowable coating material, a decorative layer or a scratch-resistant coating.

The foil according to the invention can be produced by means of lamination, optionally with an adhesive layer between inner and outer layer, by means of a casting process or—preferably—by means of coextrusion.

Another constituent of the present invention, alongside the PMMA foil according to the invention, is use thereof in the form of a process for the coating of an article. The said process is characterized in that the foil according to the invention is securely bonded to the article by lamination and/or adhesive bonding. The said article preferably involves an article made of a plastic, in particular made of PVC or ABS. The said article can by way of example be a PVC window profile. However, it is also possible to laminate the PMMA foil according to the invention to a metal surface and/or to a surface provided with an adhesive, e.g. with a PU adhesive. The article can moreover also involve another foil, onto which the PMMA foil according to the invention is laminated or extruded or coextruded.

EXAMPLES

The SEC measurements (also termed GPC measurements) were made with a column oven temperature of 35° C., using THF as eluent. They were evaluated against a PMMA standard. The system has the following combination of columns: one SDV LinL 10 µm precolumn (8*50 mm), 2 SDV LinL 10 µm columns (8*300 mm), 2 SDV 100 Å 10 µm columns (8*300 mm) (all from PSS, Mainz) and a KF-800D Solvent-Peak separation column (8*100 mm) (Shodex). PSS Win GPC-Software was used to evaluate the measurements.

Gloss is measured as reflectometer value in accordance with DIN 67 530. The angle of measurement was 60°. The measurement was made on a EUROPLEX PC 2339H black matt substrate.

Visual assessment after heat-ageing in moist conditions: the composite foils are brought into contact with a moist cloth at 60° C. and about 98% relative humidity. Adhesion is checked visually at intervals of respectively one month during ageing times of up to one year. Poor adhesion results in delamination.

Rapid peel test: a commercially available aluminium foil is smoothed on a Teflon sheet with a reflective side upwards. The PMMA foils to be tested are then placed with the inner side on the said smooth surface and smoothed with a sponge. A second aluminium foil is placed with the reflective side on the outer side of the PMMA foil and is smoothed with a sponge. The manner of placement of the aluminium foils was such that there was respectively a lateral strip of excess material of length at least 2 cm. Finally, a metal sheet is superposed and the entire test system is pressed in a platen press at 170° C. and 70 bar for 1 min. The Teflon sheet and the metal sheet are removed, and then the aluminium strips are peeled, and an assessment value of from 1 (very little adhesion) to 5 (strong adhesion) is allocated.

Boiling test: by analogy with the rapid peel test, the PMMA foils are pressed on the inner side with a PVC foil and on the outer side with an aluminium foil. The aluminium foil is removed after the pressing process. The PVC-PMMA composite foils are aged for 24 h in boiling (100° C.) or hot (90° C.) water. If adhesion is good, no visually discernible differences are expected, but if adhesion is poor bubbles are observed to form between the layers and there are other visually discernible effects.

Example 1: Production of the Oligomeric Component 60 g of methoxypropyl acetate (Dowanol PMA from Dow Chemical) as solvent, 24 g of methyl methacrylate (MMA) and 1 g of MA (methyl acrylate) are used as initial charge in a 2 L stirred tank with blade stirrers, thermometer with chart recorder, and a heatable oil jacket with attached thermostat. 3.0 g of tert-butyl 2-ethylperhexanoate and 7.0 g of n-DDM (n-dodecyl mercaptan) are added to the said mixture and heated to 90° C., with stirring. Once an exothermic reaction has been observed, the metering of a mixture of 446 g of MMA, 19 g of MA and 150 g of n-DDM is begun, and at the same time the oil jacket temperature is increased to 110° C. The metering rate here is 2.3 g/min, for about 4.3 h. Once metering has been concluded, a solution made of 38.8 g of tert-butyl 2-ethylperhexanoate in 80 g of methoxypropyl acetate is metered into the mixture over a period of 350 min, with stirring, again at an oil temperature of 110° C. Once the second metering process has been concluded, stirring is continued at 110° C. for a further 60 min. After cooling, the volatile constituents are removed on a rotary evaporator, and the product is then dried at 60° C. under high vacuum. Molar mass was determined by means of SEC. The oligomer has $M_w$=1100 g/mol.

Material for the Inner Layer

A copolymer made of 63.5% by weight of MMA, 34.3% by weight of n-butyl acrylate, 0.5% by weight of methyl acrylate and 1.7% by weight of allyl methacrylate is used as material for the inner layer. This moulding composition has two phases. Firstly, core-shell particles are present with a core made of n-butyl acrylate and with a shell made of the other three components. This component represents the impact modifier. Alongside this, a thermoplastic matrix material is present, composed of MMA and ethyl acrylate. The said polymer has $M_w$=about 95 000 to 100 000 g/mol. The Vicat softening point of the material of the inner layer is 71° C., and the glass transition temperature of the thermoplastic fraction is about 81° C. The material of the inner layer also comprises, based on 100% by weight of the polymer composition described, 1.0% by weight of Tinuvin 360, 1.0% by weight of Sabostab 119 and 1.0% by weight of CGX UVA 006 as UV stabilization package. The material of the inner layer further comprises—again based on 100% by weight of polymer composition—0.02% by weight of Sipernat 44MS from Evonik Industries (SiO$_2$ particles) as antiblocking agent.

Material for the Outer Layer

The outer layer comprises 15% by weight of matting agent based on PMMA. The composition of the said matting agent is 45% by weight of MMA, 45% by weight of n-butyl acrylate, 7% by weight of ethyl acrylate and 3% by weight of glycol dimethacrylate. The outer layer also comprises a proportion of 52% by weight of an impact modifier with a core-shell structure, where the core is composed mainly of acrylates and the shell is composed mainly of methacrylates. The overall composition of the said core-shell particle is 58.6% by weight of MMA, 40.7% by weight of n-butyl acrylate and 0.7% by weight of allyl methacrylate. Alongside this, 39% by weight of a thermoplastic matrix material is present, composed of MMA and 1% by weight of methyl acrylate. The material of the outer layer also comprises, based on 100% by weight of the polymer composition described, 1.0% by weight of Tinuvin 360, 1.0% by weight of Sabostab 119 and 1.0% by weight of CGX UVA 006 as UV stabilizer package. The said polymer has $M_w$=about 95 000 to 100 000 g/mol. The overall properties of the material of the outer layer comprise the following: Vicat softening point of at least 81° C., glass transition temperature of at least 91° C. and gloss of 20±5 at 60°. This gloss value corresponds to the gloss value of a prior-art matt foil.

Example 2: Production of the Polymer Pellets for the Inner Layer (General Specification)

The components described for the material of the inner layer, together with the polymer from Example 1, are processed in a twin-screw extruder and discharged by way of pelletizing die to give strands. The strands are comminuted in a downstream pelletizer to give pellets. The amount added of the oligomeric component from Example 1, based on the polymer components of the "material of the inner layer", is 10% by weight.

Example 3: Production of the Foil

A chill-roll process was used to produce the two-layer foil. The extrusion system used for this was composed of two (optionally three) single-screw extruders with respectively a melt pump and a coextrusion die (flat-film extrusion die with two distribution channels). The entire apparatus also comprised a set of rollers (L configuration) and a winder.

The first single-screw extruder A for producing the inner layer used the impact-modified polymethyl methacrylate according to the "material of the inner layer" listed above.

The second single-screw extruder B for producing the outer layer, which in this example is mostly matt, used the impact-modified polymethyl methacrylate moulding composition according to the "material of the outer layer" listed above.

A chill roll had been positioned centrally at a distance of about 25 mm from the discharge aperture of the coextrusion die. The temperature of the chill roll was from 70° C. to 130° C., preferably from 90° C. to 100° C. The temperature of the melt stream was about 240° C. Initial contact between the inner layer from the melt film and the surface of the roll was approximately tangential, and the angle of deflection of this layer around the roll was about 90°. After deflection around the other downstream cooling rolls, the thickness of the foil web was determined by a traversing, contactless measurement system, and the distribution melt in the die was regulated, across the width, by means of a system of thermal expansion elements and electronic data processing. The foil was then wound up. The thickness of the resultant two-layer foil was about 53 μm (10 μm inner layer and 43 μm outer layer). No bubbles were observed to form in the boiling test. The rapid peel test gives a value of 5 for the inner layer and a value of from 1 to 2 for the outer layer.

Example 4: Production of a Three-Layer Foil

The foil according to Example 4 was produced by analogy with the foil according to Example 3. However, in this case an additional third melt film was applied by way of a third single-screw extruder to the outer layer, by means of a coex adapter. As an alternative, this could also be achieved by way of a three-layer coextrusion die. Plexiglas® 8H from Evonik Industries AG was used for this purpose, being a material of particularly high molar mass. The PMMA involved here has 1% by weight of methacrylate content, a molar mass $M_w$ of 147 000 g/mol and a Vicat softening point of 108° C. The said third layer was applied with a thickness of 10 μm. No bubbles were observed to form in the boiling test. The rapid peel test gives a value of 5 for the inner layer and a value of 1 for the outer layer.

Comparative Example 1

A single-layer foil was produced from the material of the inner layer with thickness 50 μm by means of a chill-roll process. The extrusion system used for this purpose was composed of a single-screw extruder with melt pump and with a flat-film extrusion die. The entire apparatus also comprised a set of rollers (L configuration) and a winder.

The rapid peel test gives a value of 5 for both layers. The adhesive effect therefore occurs on both sides. This leads to problems during unrolling from a roll of foil for further processing, and to formation of deposit on the type of roller system that would be used for further processing. No formation of bubbles is observed in the boiling test after lamination to the PVC foil.

Comparative Example 2

By analogy with Comparative Example 1, a single-layer foil was produced from the material of the outer layer with thickness 50 μm by means of a chill-roll process.

Extensive formation of bubbles is observed in the boiling test after lamination to the PVC foil.

The rapid peel test gives a value of 1 for the upper side, and for the underside, of the foil.

The invention claimed is:

1. A PMMA foil, comprising:
   an outer layer which comprises a PMMA matrix material, and
   an inner layer which comprises the PMMA matrix material, and from 5.0 to 18% by weight of an oligomeric PMMA with a weight-average molar mass of from 300 to 1500 g/mol, measured by SEC against a PMMA standard,
   wherein at least one of said inner and outer layers comprises an impact modifier.

2. The PMMA foil according to claim 1, wherein the outer layer further comprises from 0.5 to 20% by weight of one or more matting agents.

3. The PMMA foil according to claim 2, wherein the matting agent comprises $SiO_x$ particles, $TiO_2$ particles, $BaSO_4$ particles, $BaCO_3$ particles, or crosslinked polymer particles, and the particles have a diameter of from 1 to 40 μm.

4. The PMMA foil according to claim 3, wherein the matting agent comprises crosslinked polymer particles, which comprise PMMA particles or silicone particles.

5. The PMMA foil according to claim 1, wherein the inner layer further comprises from 0.01 to 0.5% by weight of one or more antiblocking agents.

6. The PMMA foil according to claim 5, wherein the antiblocking agent comprises $SiO_x$ particles, $TiO_x$ particles, $BaSO_4$ particles, $BaCO_3$ particles, crosslinked PMMA particles, or crosslinked silicone particles, and the particles have a diameter of from 0.5 μm to 40 μm.

7. The PMMA foil according to claim 1, wherein both the outer and inner layers comprise an impact modifier.

8. The PMMA foil according to claim 1, wherein the impact modifier comprises core-shell particles or core-shell-shell particles, and at least one shell comprises a poly(meth)acrylate.

9. The PMMA foil according to claim 1, wherein the PMMA matrix material is obtained through polymerization of a composition comprising from 80 to 100% by weight of methyl methacrylate and from 0 to 20% by weight of one or more other ethylenically unsaturated monomers capable of free-radical polymerization.

10. The PMMA foil according to claim 1, wherein the outer layer further comprises from 2.0 to 12% by weight of one or more matting agents.

11. The PMMA foil according to claim 3, wherein the particles in the matting agent have a diameter of from 1.5 to 20 μm.

12. The PMMA foil according to claim 1, wherein the inner layer and/or the outer layer further comprises an HALS compound, a triazine, and/or a benzotriazole.

13. The PMMA foil according to claim 1, wherein a thickness of the inner layer is from 2 to 100 μm, and a thickness of the outer layer is from 2 to 100 μm.

14. The PMMA foil according to claim 1, further comprising:
   on the outer layer, a third layer with a thickness of from 2 to 100 μm.

15. The PMMA foil according to claim 14, wherein the third layer comprises a scratch-resistant PMMA layer, a PVDF layer, a PMMA/PVDF layer or a decorative layer.

16. A method for coating an article, said method comprising:
   securely bonding the PMMA foil according to claim 1 to the article by lamination and/or adhesive bonding.

17. The method according to claim 16, wherein the article comprises plastic.

18. The PMMA foil according to claim 1, wherein the oligomeric PMMA has the same composition as the PMMA matrix material.

* * * * *